United States Patent
Tsukagoshi et al.

(10) Patent No.: US 8,650,858 B2
(45) Date of Patent: Feb. 18, 2014

(54) EXHAUST EMISSION CONTROL DEVICE FOR INTERNAL COMBUSTION ENGINE

(75) Inventors: Takahiro Tsukagoshi, Susono (JP); Kouji Morita, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/258,821

(22) PCT Filed: Oct. 14, 2010

(86) PCT No.: PCT/JP2010/068035
§ 371 (c)(1), (2), (4) Date: Sep. 22, 2011

(87) PCT Pub. No.: WO2012/049751
PCT Pub. Date: Apr. 19, 2012

(65) Prior Publication Data
US 2013/0192209 A1 Aug. 1, 2013

(51) Int. Cl.
*F01N 3/00* (2006.01)
*F01N 3/10* (2006.01)
*F02B 13/00* (2006.01)

(52) U.S. Cl.
USPC .................. 60/276; 60/285; 60/299; 123/575

(58) Field of Classification Search
USPC ..................... 60/276, 285, 299, 301; 123/575
See application file for complete search history.

(56) References Cited

U.S. PATENT DOCUMENTS 5,253,631 A 10/1993 Curran

FOREIGN PATENT DOCUMENTS

| JP | A-62-096743 | 5/1987 |
| JP | A-03-121231 | 5/1991 |
| JP | A-05-001574 | 1/1993 |
| JP | A-06-200807 | 7/1994 |
| JP | A-2009-114992 | 5/2009 |
| JP | A-2010-024925 | 2/2010 |

OTHER PUBLICATIONS

International Search Report issued in InternationalApplication No. PCT/JP2010/068035 dated Nov. 16, 2010 (with translation).

*Primary Examiner* — Kenneth Bomberg
*Assistant Examiner* — Audrey K Bradley
(74) *Attorney, Agent, or Firm* — Oliff PLC

(57) ABSTRACT

An exhaust emission control apparatus for an internal combustion engine includes: an exhaust gas purification catalyst arranged in an exhaust gas passage of the internal combustion engine; an air/fuel ratio sensor installed on an upstream side of the exhaust gas purification catalyst and detects an air/fuel ratio of an exhaust gas discharged from the internal combustion engine; air/fuel ratio feedback control means that performs feedback control of the air/fuel ratio based on an output of the air/fuel ratio sensor; and sensor output correcting means that corrects a shift in the output of the air/fuel ratio sensor. The sensor output correcting means is configured so as to correct a shift in the output of the air/fuel ratio sensor using a lean shift amount of the air/fuel ratio sensor output in accordance with a quantity and/or a proportion of an aldehyde included in the exhaust gas.

12 Claims, 5 Drawing Sheets

EXHAUST EMISSION CONTROL DEVICE FOR INTERNAL COMBUSTION ENGINE

TECHNICAL FIELD

The present invention relates to an exhaust emission control apparatus for an internal combustion engine.

BACKGROUND ART

In order to obtain a high purification rate with an exhaust gas purification catalyst (three-way catalyst) of an internal combustion engine, it is necessary for the air/fuel ratio of the exhaust gas to be in the vicinity (purification window) of a stoichiometric air/fuel ratio. Therefore, the air/fuel ratio of the exhaust gas is detected by an air/fuel ratio sensor that is installed on an upstream side of the exhaust gas purification catalyst, and air/fuel ratio feedback control is performed that corrects a fuel injection quantity so that the air/fuel ratio becomes the stoichiometric air/fuel ratio.

A technique is also being widely used in which a sub-exhaust gas sensor that is constituted by an oxygen sensor or the like is further provided on a downstream side of an exhaust gas purification catalyst, and sub-feedback control for supplementing the air/fuel ratio feedback control (main feedback control) is performed based on an output of the sub-exhaust gas sensor. Since the effect of a shift in the output of the air/fuel ratio sensor can be corrected by performing sub-feedback control, the air/fuel ratio of the internal combustion engine can be controlled so as to equal the stoichiometric air/fuel ratio with a high degree of accuracy.

However, at a time of engine start-up, since the air/fuel ratio sensor and the sub-exhaust gas sensor are not activated, air/fuel ratio feedback control and sub-feedback control can not be performed until the air/fuel ratio sensor and the sub-exhaust gas sensor are warmed up and activated. Because the sub-exhaust gas sensor is on the downstream side of the air/fuel ratio sensor, it takes time for the sub-exhaust gas sensor to warm up, and consequently the sub-exhaust gas sensor is activated later than the air/fuel ratio sensor. Therefore, the air/fuel ratio feedback control is performed based on only the output of the air/fuel ratio sensor during a period from activation of the air/fuel ratio sensor until activation of the sub-exhaust gas sensor.

Japanese Patent Laid-Open No. 2009-114992 discloses a technique that determines fuel properties by utilizing a fact that the characteristics of a shift (cold chute) in an output generated at an early stage after warming up of an air/fuel ratio sensor starts differ according to the fuel properties (alcohol concentration and the like). The term "cold chute" refers to a phenomenon that is thought to occur as a result of organic substances in unburned gas that remains inside an exhaust gas passage when the engine is stopped adhering to a sensor element, and then reacting at a time of engine start-up. When warming up of the air/fuel ratio sensor is completed, the cold chute phenomenon ends.

CITATION LIST

Patent Literature

Patent Literature 1: Japanese Patent Laid-Open No. 2009-114992

Patent Literature 2: Japanese Patent Laid-Open No. 05-1574

SUMMARY OF INVENTION

Technical Problem

Even after warming up (activation) of an air/fuel ratio sensor is finished and air/fuel ratio feedback control has started, a component included in an exhaust gas may cause a shift to occur in the output of the air/fuel ratio sensor. The effect of such an output shift can be corrected by performing sub-feedback control. However, sub-feedback control can not be performed during a period until the sub-exhaust gas sensor is activated. Consequently, if a shift occurs in the output of the air/fuel ratio sensor in that period, the air/fuel ratio of the internal combustion engine will deviate from a purification window (vicinity of the stoichiometric air/fuel ratio) of the exhaust gas purification catalyst, which will in turn lead to a decline in the purification rate.

According to the findings of the present inventors, in an internal combustion engine that uses an alcohol-containing fuel, a purification rate at an exhaust gas purification catalyst is liable to decrease during a period from the start of air/fuel ratio feedback control until the start of sub-feedback control. This phenomenon is considered to be due to the air/fuel ratio of the internal combustion engine deviating from the purification window of the exhaust gas purification catalyst as the result of a shift occurring in an output of the air/fuel ratio sensor that is caused by characteristic components that are generated in an exhaust gas when an alcohol-containing fuel is used.

The present invention has been made in consideration of the above circumstances, and an object of the invention is to provide an exhaust emission control apparatus for an internal combustion engine that can precisely control an air/fuel ratio and improve an exhaust gas purification rate even in an internal combustion engine that uses an alcohol-containing fuel.

Solution to Problem

A first invention for achieving the above object is an exhaust emission control apparatus for an internal combustion engine, comprising:

an exhaust gas purification catalyst that is arranged in an exhaust gas passage of the internal combustion engine and that purifies an exhaust gas;

an air/fuel ratio sensor that is arranged on an upstream side of the exhaust gas purification catalyst and that detects an air/fuel ratio of an exhaust gas that is discharged from the internal combustion engine;

air/fuel ratio feedback control means that performs feedback control of the air/fuel ratio of the internal combustion engine based on an output of the air/fuel ratio sensor; and sensor output correcting means that corrects a shift in the output of the air/fuel ratio sensor that is caused by a component included in the exhaust gas;

wherein the sensor output correcting means is configured so as to correct a shift in the output of the air/fuel ratio sensor using a lean shift amount of the output of the air/fuel ratio sensor in accordance with a quantity and/or a proportion of an aldehyde included in the exhaust gas.

A second invention is in accordance with the first invention, wherein the sensor output correcting means includes estimating means that estimates an aldehyde concentration in an exhaust gas that is discharged from the internal combustion engine or a ratio between an aldehyde concentration and a hydrogen concentration in the exhaust gas, and corrects a shift in the output of the air/fuel ratio sensor based on an estimation result of the estimating means.

A third invention is in accordance with the second invention, further comprising:
alcohol concentration acquiring means that detects or estimates an alcohol concentration of a fuel; and
engine temperature detecting means that detects a representative temperature of the internal combustion engine;
wherein the estimating means performs the estimation by referring to at least an alcohol concentration that is acquired by the alcohol concentration acquiring means and a representative temperature that is detected by the engine temperature detecting means.

A fourth invention is in accordance with the first invention, further comprising:
combustion state variable means that can change a combustion state of the internal combustion engine so that at least an aldehyde concentration is changed among components included in an exhaust gas that is discharged from the internal combustion engine;
exhaust gas component ratio control means that, at a predetermined timing after engine startup, starts an exhaust gas component ratio control that controls the combustion state variable means so that a ratio between an aldehyde concentration and a hydrogen concentration in the exhaust gas that is discharged from the internal combustion engine is close to a target ratio; and
storing means that stores an output shift correction value for correcting a shift in an output of the air/fuel ratio sensor;
wherein the sensor output correcting means corrects the shift in the output of the air/fuel ratio sensor using an output shift correction value that is stored in the storing means.

A fifth invention is in accordance with the fourth invention, wherein the predetermined timing is related with a timing at which the feedback control starts or a timing at which the exhaust gas purification catalyst is activated.

A sixth invention is in accordance with the fourth or the fifth invention,
wherein the storing means stores a relationship between an alcohol concentration of a fuel and the output shift correction value;
the exhaust emission control apparatus further comprising:
alcohol concentration acquiring means that detects or estimates an alcohol concentration of a fuel; and
output shift correction value calculating means that calculates the output shift correction value based on an alcohol concentration that is acquired by the alcohol concentration acquiring means and the relationship.

A seventh invention is in accordance with any one of the fourth to the sixth inventions, wherein the output shift correction value is a value that is determined so as to correct a shift in an output of the air/fuel ratio sensor that occurs in a case where an aldehyde and hydrogen are included at the target ratio in an exhaust gas.

An eighth invention is in accordance with any one of the fourth to the seventh inventions, further comprising:
a variable valve apparatus that varies a valve-opening characteristic of one or both of an intake valve and an exhaust valve of the internal combustion engine;
wherein the combustion state variable means changes a combustion state by changing a valve-opening characteristic of one or both of the intake valve and the exhaust valve by means of the variable valve apparatus.

A ninth invention is in accordance with any one of the fourth to the eighth inventions, further comprising:

a sub-exhaust gas sensor that is installed on a downstream side of the exhaust gas purification catalyst; and
sub-feedback control means that performs sub-feedback control for supplementing the feedback control, based on an output of the sub-exhaust gas sensor;
wherein the exhaust gas component ratio control means ends the exhaust gas component ratio control accompanying a start of the sub-feedback control.

A tenth invention is in accordance with any one of the fourth to the ninth inventions, wherein the exhaust gas component ratio control means controls the combustion state variable means so that an aldehyde concentration in an exhaust gas that is discharged from the internal combustion engine after the exhaust gas component ratio control starts becomes lower than an aldehyde concentration in an exhaust gas that is discharged from the internal combustion engine before the exhaust gas component ratio control starts.

A eleventh invention is in accordance with any one of the fourth to the tenth inventions, wherein the exhaust gas component ratio control means controls the combustion state variable means so that an unburned alcohol concentration in an exhaust gas that is discharged from the internal combustion engine after the exhaust gas component ratio control starts becomes higher than an unburned alcohol concentration in an exhaust gas that is discharged from the internal combustion engine before the exhaust gas component ratio control starts.

A twelfth invention is in accordance with any one of the first to the eleventh inventions, wherein the sensor output correcting means is configured so as to correct a shift in an output of the air/fuel ratio sensor by taking into account a fact that unburned alcohol included in an exhaust gas shifts an output of the air/fuel ratio sensor to a lean side.

Advantageous Effects of Invention

According to the first invention, a shift in an air/fuel ratio sensor output can be corrected using a lean shift amount of the air/fuel ratio sensor output in accordance with a quantity and/or a proportion of an aldehyde included in an exhaust gas. When alcohol-containing fuel is used, an aldehyde that is an intermediate in an alcohol combustion reaction process is included in an exhaust gas that is discharged from the internal combustion engine, and the aldehyde has an action that shifts the output of the air/fuel ratio sensor to a lean side. According to the first invention, since a shift in an output of the air/fuel ratio sensor that is caused by an aldehyde can be appropriately corrected, precise feedback control can be performed with respect to the air/fuel ratio. Thus, the purification rate of the exhaust gas purification catalyst can be improved.

According to the second invention, a shift in the output of the air/fuel ratio sensor caused by an aldehyde can be appropriately corrected by means of a simple configuration.

According to the third invention, an aldehyde concentration or a ratio between an aldehyde concentration and a hydrogen concentration in an exhaust gas that is discharged from an internal combustion engine can be exactly estimated by a simple method.

According to the fourth invention, by performing exhaust gas component ratio control, a ratio between an aldehyde concentration and a hydrogen concentration in an exhaust gas that is discharged from an internal combustion engine can be controlled so as to be close to a target ratio. An aldehyde has an action that shifts an air/fuel ratio sensor output to a lean side and hydrogen has an action that shifts an air/fuel ratio sensor output to a rich side, and a shift in the air/fuel ratio sensor output is determined by a balance (ratio) between the aldehyde and the hydrogen. A ratio between an aldehyde concentration and a hydrogen concentration in an exhaust gas discharged from an internal combustion engine at a predetermined timing after engine start-up normally differs depending on the engine temperature when the engine is started. In this respect, according to the fourth invention, by performing exhaust gas component ratio control, irrespective of the engine temperature at the time of engine start-up, the ratio between an aldehyde concentration and a hydrogen concentration can be controlled so as to be close to a predetermined target ratio. Consequently, irrespective of the engine temperature at the time of engine start-up, a shift in an air/fuel ratio sensor output can be appropriately corrected using the same output shift correction value. Thus, the control is simple, and the control accuracy can also be enhanced.

According to the fifth invention, exhaust gas component ratio control can be performed in association with a timing at which feedback control of the air/fuel ratio starts or at a timing at which an exhaust gas purification catalyst is activated. Consequently, exhaust gas component ratio control can be executed at an appropriate timing.

According to the sixth invention, an appropriate output shift correction value can be set in accordance with an alcohol concentration of a fuel. Therefore, even when fuels with various alcohol concentrations are used, a shift in an air/fuel ratio sensor output can be corrected with greater accuracy.

According to the seventh invention, an output shift correction value is used that is determined so as to correct a shift in an output of an air/fuel ratio sensor that occurs when an aldehyde and hydrogen are included in an exhaust gas at a target ratio. By performing exhaust gas component ratio control, a ratio between an aldehyde concentration and a hydrogen concentration is controlled so as to be close to the target ratio. Therefore, by using an output shift correction value as described above, a shift in an air/fuel ratio sensor output can be appropriately corrected.

According to the eighth invention, by using a variable valve apparatus as combustion state variable means, exhaust gas component ratio control can be performed simply and with a high degree of accuracy.

According to the ninth invention, since exhaust gas component ratio control ends accompanying the start of sub-feedback control, a timing of the end of the exhaust gas component ratio control can be appropriately controlled.

According to the tenth invention, an aldehyde concentration in an exhaust gas discharged from an internal combustion engine after exhaust gas component ratio control starts is controlled so as to be lower than an aldehyde concentration in the exhaust gas discharged from the internal combustion engine before exhaust gas component ratio control starts. Therefore, since the aldehyde concentration after exhaust gas component ratio control starts can be lowered, a shift in an air/fuel ratio sensor output that is caused by an aldehyde can be reduced. Thus, a shift in the air/fuel ratio sensor output can be corrected with greater precision.

According to the eleventh invention, an unburned alcohol concentration in an exhaust gas discharged from an internal combustion engine after exhaust gas component ratio control starts is controlled so as to be higher than an unburned alcohol concentration in the exhaust gas discharged from the internal combustion engine before exhaust gas component ratio control starts. After exhaust gas component ratio control starts, since unburned alcohol can be favorably purified by an exhaust gas purification catalyst, even if a concentration of unburned alcohol in the exhaust gas discharged from the internal combustion engine is high, a problem does not arise. In contrast, before exhaust gas component ratio control starts, since unburned alcohol can not be favorably purified by an exhaust gas purification catalyst, it is desirable that a concentration of unburned alcohol in the exhaust gas discharged from the internal combustion engine is as low as possible. According to the eleventh invention, since a concentration of unburned alcohol in the exhaust gas discharged from the internal combustion engine can be lowered before exhaust gas component ratio control starts, it is possible to suppress emissions that are generated before exhaust gas component ratio control starts.

According to the twelfth invention, a shift in the output of the air/fuel ratio sensor can be corrected by taking into account a fact that unburned alcohol included in an exhaust gas shifts an output of the air/fuel ratio sensor to a lean side. Consequently, even when a large amount of unburned alcohol is included in an exhaust gas, a shift in the output of the air/fuel ratio sensor that is caused by the unburned alcohol can be appropriately corrected, and thus precise feedback control can be performed with respect to the air/fuel ratio. Hence, the purification rate of an exhaust gas purification catalyst can be improved.

DESCRIPTION OF EMBODIMENTS

Embodiment 1

Figure 1:
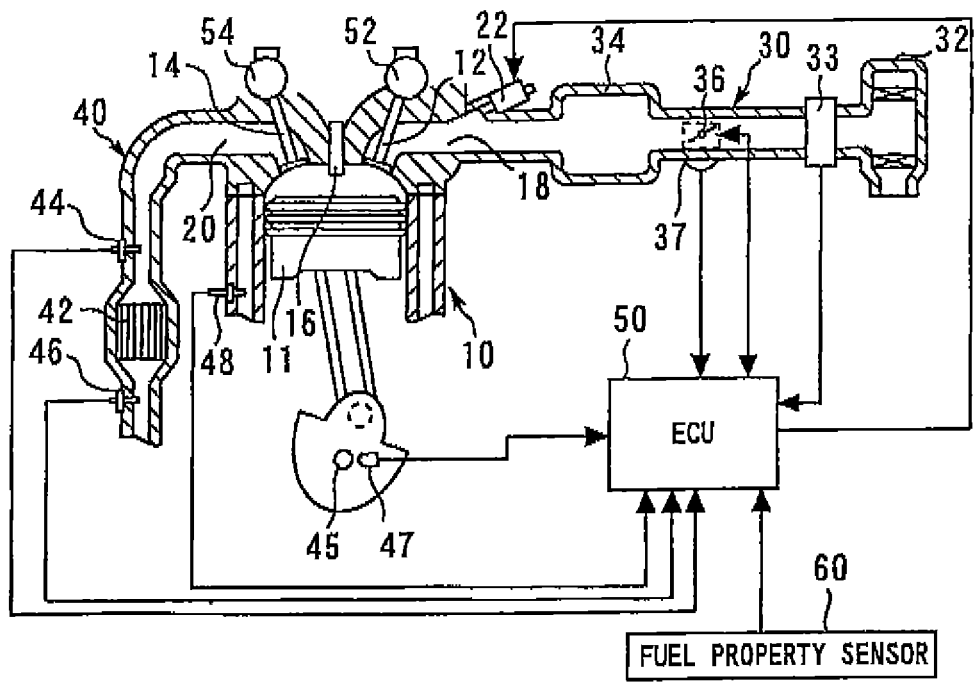
FIG. 1 is a view for describing a system configuration of Embodiment 1 of the present embodiment.

FIG. 1 is a view for describing a system configuration of Embodiment 1 of the present embodiment. As shown in FIG. 1, a system according to the present embodiment includes an internal combustion engine 10. The internal combustion engine 10 of the present invention can operate using gasoline as a fuel, and can also operate using a fuel in which an alcohol such as ethanol or methanol and gasoline are mixed (hereunder, also referred to as "alcohol-containing fuel"). In this case, a fuel in which a concentration of an alcohol component (proportion of an alcohol component) is from a low concentration (for example, about several %) to a high concentration (for example, 80% or more) can be used as an alcohol-containing fuel.

Each cylinder of the internal combustion engine 10 includes a piston 11, an intake valve 12, an exhaust valve 14, a spark plug 16, an intake port 18 and an exhaust port 20 that communicate inside the cylinder, and a fuel injector 22 that injects a fuel into the intake port 18. According to the present invention, a fuel injector may be provided so as to directly inject fuel into a cylinder, or a fuel injector may be provided so as to inject fuel into both an intake port and a cylinder.

An air intake passage 30 is connected to the intake port 18 of each cylinder. An air cleaner 32 is provided at an upstream end of the air intake passage 30. Air passes through the air cleaner 32 and is taken into the air intake passage 30. An air flow meter 33 that detects an intake air flow is arranged on a downstream side of the air cleaner 32. A surge tank 34 is provided at a branching portion at which the air intake passage 30 branches into the cylinder intake port 18 of each cylinder. A throttle valve 36 is arranged on an upstream side of the surge tank 34. A throttle position sensor 37 for detecting a degree of opening of the throttle valve 36 is attached to the throttle valve 36.

An exhaust gas passage 40 is connected to the exhaust port 20 of each cylinder. An exhaust gas purification catalyst 42 for purifying an exhaust gas is provided in the exhaust gas passage 40. The exhaust gas purification catalyst 42 has a function as a three-way catalyst. The exhaust gas purification catalyst 42 can purify harmful components most efficiently when an air/fuel ratio of an exhaust gas that flows into the exhaust gas purification catalyst 42 is in a purification window that is close to a stoichiometric air/fuel ratio.

An air/fuel ratio sensor (main exhaust gas sensor) 44 that detects an air/fuel ratio of an exhaust gas is arranged on an upstream side of the exhaust gas purification catalyst 42. An air/fuel ratio that the air/fuel ratio sensor 44 detects is an air/fuel ratio of an exhaust gas before the exhaust gas flows into the exhaust gas purification catalyst 42. More specifically, an air/fuel ratio that the air/fuel ratio sensor 44 detects is an air/fuel ratio of an exhaust gas (hereunder, referred to as "engine output gas") that is in the same state as when the exhaust gas is discharged from the internal combustion engine 10. For example, a wide-area air/fuel ratio sensor that emits an approximately linear output with respect to an air/fuel ratio of an exhaust gas can be preferably used as the air/fuel ratio sensor 44.

A sub-exhaust gas sensor 46 is arranged on a downstream side of the exhaust gas purification catalyst 42. An air/fuel ratio that the sub-exhaust gas sensor 46 detects is an air/fuel ratio of an exhaust gas after the exhaust gas has passed through the exhaust gas purification catalyst 42. For example, an oxygen sensor that emits an output that changes rapidly in accordance with whether an air/fuel ratio of an exhaust gas is rich or lean with respect to a stoichiometric air/fuel ratio can be preferably used as the sub-exhaust gas sensor 46. In this connection, according to the present invention, another exhaust gas purification catalyst may be further arranged on a downstream side of the exhaust gas purification catalyst 42.

A crank angle sensor 47 that detects a rotational position (crank angle) of a crankshaft 45 of the internal combustion engine 10 is provided in the vicinity of the crankshaft 45. A water temperature sensor 48 that detects a cooling water temperature is also arranged in the internal combustion engine 10.

The internal combustion engine 10 includes an intake variable valve apparatus 52 that can vary valve opening characteristics (opening time, closing time, working angle, lift amount and the like) of the intake valve 12. The internal combustion engine 10 may further include an exhaust variable valve apparatus 54 that can vary valve opening characteristics (opening time, closing time, working angle, lift amount and the like) of the exhaust valve 14. Since various known mechanisms can be used as the intake variable valve apparatus 52 or the exhaust variable valve apparatus 54, a description of a specific mechanism is omitted here.

As described above, the internal combustion engine 10 of the present embodiment can operate by using an alcohol-containing fuel. The system of the present embodiment includes a fuel property sensor 60 that can detect an alcohol concentration of a fuel. For example, a device that detects an alcohol concentration by measuring a dielectric constant or a refractive index or the like of a fuel can be used as the fuel property sensor 60. The fuel property sensor 60 can be installed, for example, in a fuel tank (not shown) or in the middle of a fuel supply channel from the fuel tank to the fuel injector 22. Further, according to the present invention, a method that detects an alcohol concentration of a fuel is not limited to a method that uses the fuel property sensor 60 and, for example, a configuration may be adopted in which an alcohol concentration of a fuel is detected (estimated) based on a learned value in air/fuel ratio feedback control. Since a value of a stoichiometric air/fuel ratio differs with respect to gasoline and alcohol, a value of a stoichiometric air/fuel ratio of an alcohol-containing fuel will differ according to the alcohol concentration thereof. Therefore, an alcohol concentration of a fuel can be detected (estimated) based on a value of a stoichiometric air/fuel ratio of the fuel that can be learned by means of air/fuel ratio feedback control or sub-feedback control as described later.

The system of the present embodiment includes an ECU (Electronic Control Unit) 50. The above described various sensors and actuators are electrically connected to the ECU 50. The ECU 50 can control an operating state of the internal combustion engine 10 by controlling the operation of the respective actuators based on the outputs of the respective sensors.

[Engine Output Gas Reduction Control]

At engine start-up, the exhaust gas purification catalyst 42, the air/fuel ratio sensor 44, and the sub-exhaust gas sensor 46 are at a low temperature and are not activated. Consequently, harmful components can not be purified by the exhaust gas purification catalyst 42. Accordingly, during a period immediately after engine start-up, it is important to reduce the amount of harmful components in the engine output gas in order to reduce emissions. Therefore, according to the present embodiment, after engine start-up, engine output gas reduction control for reducing the amount of harmful components in the engine output gas is executed.

The engine output gas reduction control according to the present embodiment is control for suppressing the discharge of unburned alcohol in particular. When alcohol-containing fuel is being used, unburned alcohol is included in the engine output gas. Unburned alcohol is a component that arises when alcohol in a fuel fails to evaporate. More specifically, unburned alcohol in the engine output gas is alcohol which did not contribute to combustion and which is discharged as it is from a combustion chamber. Gasoline is made up of multiple components and includes components that have a low boiling point. Hence, gasoline exhibits excellent vaporization characteristics even at a low temperature. In contrast, the boiling point of an alcohol is fixed since an alcohol is a single-component substance, and the boiling point thereof is also high (approximately 78° C. in the case of ethanol). Consequently, when the temperature of the internal combustion engine 10 is low, such as at engine start-up, it is difficult for an alcohol in the fuel to evaporate and the unburned alcohol concentration in the engine output gas is liable to increase. It is therefore necessary to reduce the unburned alcohol concentration.

Figure 2:
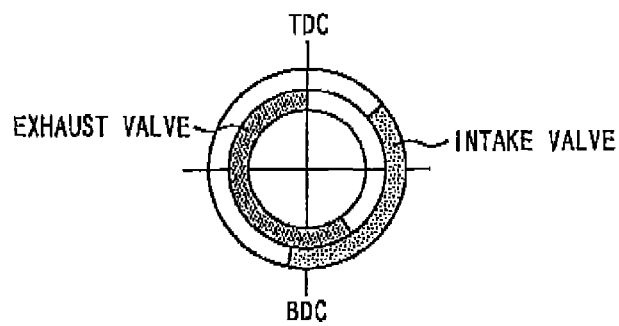
FIG. 2 is a view that illustrates an example of a valve opening period of an intake valve and an exhaust valve during execution of an engine output gas reduction control.

According to the present embodiment, control that retards the intake valve opening timing and control that advances the intake valve closing timing is performed by the intake variable valve apparatus 52 as engine output gas reduction control. FIG. 2 is a view that illustrates an example of a valve opening period of the intake valve 12 and the exhaust valve 14 during execution of the engine output gas reduction control. As shown in FIG. 2, during the engine output gas reduction control, the intake valve opening timing is retarded so that the intake valve 12 opens at a point after the top dead centre. Since the inside of the cylinder becomes a negative pressure if the top dead centre is exceeded while the intake valve 12 remains in a closed state, when the intake valve 12 is opened thereafter, air of the intake port 18 is vigorously drawn into the cylinder. More specifically, the speed of an intake airflow into the cylinder increases. As a result of the increase in the intake airflow speed, the inside of the cylinder is agitated and atomization of a fuel spray is promoted. As a result, vaporization of alcohol accelerates and the proportion of alcohol that is combusted rises, and hence the amount of unburned alcohol in the engine output gas can be reduced. Further, during the engine output gas reduction control, by advancing the intake valve closing timing, the intake valve 12 is closed near to the bottom dead center. Since the actual compression ratio increases as the intake valve closing timing approaches the bottom dead center, the temperature inside the cylinder rises. Consequently, vaporization of alcohol is promoted and the proportion of alcohol that is burned increases, and thus the amount of unburned alcohol in the engine output gas can be reduced.

[Air/Fuel Ratio Feedback Control]

According to the system of the present embodiment, feedback control (hereunder, referred to as "main feedback control") can be performed that controls an air/fuel ratio by correcting a fuel injection quantity based on an output of the air/fuel ratio sensor 44. Further, according to the system of the present embodiment, sub-feedback control that supplements the main feedback control can also be performed based on the output of the sub-exhaust gas sensor 46.

The following processing is executed when the main feedback control and the sub-feedback control are performed. First, the ECU 50 calculates a corrected air/fuel ratio sensor output that is expressed by the following equation based on an output of the air/fuel ratio sensor 44 (hereunder, also referred to as "air/fuel ratio sensor output") and an output of the sub-exhaust gas sensor 46:

corrected air/fuel ratio sensor output=air/fuel ratio sensor output+sub-feedback correction value The ECU 50 executes processing that controls the fuel injection quantity of the fuel injector 22 so that the above described corrected air/fuel ratio sensor output is a value that corresponds to the target air/fuel ratio. More specifically, the ECU 50 executes processing that converts the corrected air/fuel ratio sensor output into an air/fuel ratio, processing that calculates a deviation ΔA/F between the air/fuel ratio that is obtained as a result of the aforementioned processing and a target air/fuel ratio, and processing that reflects the deviation ΔA/F in correction of the fuel injection quantity with a predetermined gain.

When the air/fuel ratio sensor 44 exhibits ideal characteristics, the air/fuel ratio sensor output and the air/fuel ratio of the engine output gas exhibit a unique relationship. In this case, if main feedback control is executed so that the air/fuel ratio sensor output is a value that corresponds to the stoichiometric air/fuel ratio, an exhaust gas that flows into the exhaust gas purification catalyst 42 is an exhaust gas that has an air/fuel ratio (air/fuel ratio in a purification window) that is close to a stoichiometric air/fuel ratio, and thus only purified exhaust gas flows out to the downstream side of the exhaust gas purification catalyst 42.

However, in reality, the air/fuel ratio sensor 44 does not necessarily exert ideal output characteristics at all times. This is due to factors such as individual differences and aged deterioration of the air/fuel ratio sensor 44 and the signal transmission system, or changes in the operating state of the internal combustion engine 10.

In contrast, the sub-exhaust gas sensor 46 can detect a stoichiometric air/fuel ratio with a high degree of accuracy. Therefore, by utilizing the sub-exhaust gas sensor 46 it is possible to precisely detect whether the air/fuel ratio of an exhaust gas downstream of the exhaust gas purification catalyst 42 is richer or leaner than the stoichiometric air/fuel ratio.

When the sub-exhaust gas sensor 46 detects that the air/fuel ratio of an exhaust gas that is downstream of the exhaust gas purification catalyst 42 is rich, it can be determined that the overall air/fuel ratio of the engine output gas is shifted to the rich side. In such a case, it is possible to bring the air/fuel ratio of the engine output gas close to the stoichiometric air/fuel ratio by correcting the air/fuel ratio sensor output so that a quantity calculated with respect to the fuel injection quantity is less than in the current state. Conversely, when the sub-exhaust gas sensor 46 detects that the air/fuel ratio of an exhaust gas downstream of the exhaust gas purification catalyst 42 is lean, it can be determined that the overall air/fuel ratio of the engine output gas is shifted to the lean side. In such a case, it is possible to bring the air/fuel ratio of the engine output gas close to the stoichiometric air/fuel ratio by correcting the air/fuel ratio sensor output so that a quantity calculated with respect to the fuel injection quantity is more than in the current state. The above described sub-feedback correction value is a correction value for implementing the functions as described above. The sub-feedback control fulfills out a function of supplementing the main feedback control in the manner described above.

The sub-feedback correction value is, for example, calculated as follows. The ECU 50 calculates the sub-feedback correction value by performing a predetermined operation with respect to a deviation between the output of the sub-exhaust gas sensor 46 and a reference output (output that corresponds to a stoichiometric air/fuel ratio). When calculating the sub-feedback correction value by means of PID control, the sub-feedback correction value is calculated as a total of a proportional term, an integral term, and a derivative term based on the aforementioned deviation.

After engine start-up, when the exhaust gas purification catalyst 42 is activated the air/fuel ratio feedback control as described above is performed and a high exhaust gas purification rate can be obtained by controlling the air/fuel ratio of the engine output gas so as to fall within a purification window that is close to the stoichiometric air/fuel ratio. However, in order for the air/fuel ratio sensor 44 and the sub-exhaust gas sensor 46 to function, it is necessary that the respective sensor elements thereof are heated to a temperature that is equal to or greater than a temperature at which catalysts thereof are activated. Since the air/fuel ratio sensor 44 and the sub-exhaust gas sensor 46 are at a low temperature immediately after engine start-up, a certain time is required until activation thereof. Further, in comparison to the air/fuel ratio sensor 44, because the sub-exhaust gas sensor 46 is on a downstream side of the exhaust gas passage 40, the amount of heat that the sub-exhaust gas sensor 46 receives from the exhaust gas is small. Consequently, a timing at which the sub-exhaust gas sensor 46 is activated is later than a timing at which the air/fuel ratio sensor 44 is activated. For the foregoing reasons, according to the present embodiment, after engine start-up, the main feedback control is started after both the air/fuel ratio sensor 44 and the exhaust gas purification catalyst 42 are activated. Thereafter, after waiting until the sub-exhaust gas sensor 46 is activated, the sub-feedback control starts. More specifically, during a period from after start of the main feedback control until the sub-exhaust gas sensor 46 is activated, the main feedback control is executed without being accompanied by the sub-feedback control.

In order to exert the maximum purification capability of the exhaust gas purification catalyst 42, it is important to control the air/fuel ratio of the engine output gas as accurately as possible so that the air/fuel ratio falls within a purification window that is close to the stoichiometric air/fuel ratio. Since precise feedback of the air/fuel ratio is necessary for that purpose, it is important to detect the air/fuel ratio of the exhaust gas as accurately as possible.

As described in the foregoing, the sub-exhaust gas sensor 46 is capable of detecting the stoichiometric air/fuel ratio with a high degree of accuracy. Therefore, after the start of the sub-feedback control, even if the output of the air/fuel ratio sensor 44 is shifted to some extent, the effect of such a shift can be corrected by sub-feedback control using the sub-exhaust gas sensor 46. It is therefore possible to precisely control the air/fuel ratio of the engine output gas and maintain the air/fuel ratio within a catalyst window that is close to the stoichiometric air/fuel ratio.

In contrast, correction by means of the sub-feedback control is not performed during a period from the start of the main feedback control until the start of the sub-feedback control (hereunder, referred to as "initial feedback period"). Consequently, in order to control the air/fuel ratio of the engine output gas as accurately as possible to approach the stoichiometric air/fuel ratio in the initial feedback period, it is necessary to detect the air/fuel ratio of the engine output gas as exactly as possible based on only the output of the air/fuel ratio sensor 44.

However, in some cases a shift (a deviation from an appropriate output or an ideal output) that is caused by a specific component in an exhaust gas arises with respect to the output of the air/fuel ratio sensor 44. For example, hydrogen as an intermediate (that is, a partially combusted component) that is generated in the process of a combustion reaction of a fuel is generated in an exhaust gas (engine output gas). Hydrogen in an exhaust gas has an action that shifts an air/fuel ratio sensor output to a rich side. More specifically, in some cases the air/fuel ratio sensor output shifts more to the rich side than the actual air/fuel ratio due to the influence of hydrogen in the exhaust gas.

In contrast, unburned alcohol in an exhaust gas has an action that shifts an air/fuel ratio sensor output to a lean side. Further, when using an alcohol-containing fuel, an aldehyde (aldehydes) is also included in engine output gas. An aldehyde is a substance that is represented by the general formula R—CHO, and examples of an aldehyde include acetaldehyde and formaldehyde. An aldehyde included in engine output gas is an intermediate (that is, a partially combusted component) that is generated in the process of a combustion reaction of an alcohol. An aldehyde in an exhaust gas has an action that shifts an air/fuel ratio sensor output to the lean side. Accordingly, when using an alcohol-containing fuel the effects of an action of a component (hydrogen) that shifts the air/fuel ratio sensor output to the rich side and actions of components (aldehyde and unburned alcohol) that shift the air/fuel ratio sensor output to the lean side overlap. A lean shift amount of an air/fuel ratio sensor output caused by aldehyde included in the exhaust gas correlates with the amount and proportion of the aldehyde included in the exhaust gas. According to the present invention, by correcting a shift in an air/fuel ratio sensor output using a lean shift amount of the air/fuel ratio sensor output in accordance with the quantity and/or proportion of aldehyde included in the exhaust gas, the effect of a shift in the air/fuel ratio sensor output that is caused by aldehyde included in the exhaust gas can be appropriately corrected.

Conventionally, when an alcohol-containing fuel is used, the exhaust gas purification rate is liable to be low in the initial feedback period. According to the findings of the present inventors, it is considered that the reason is that a shift occurs in the air/fuel ratio sensor output due to the presence of aldehyde or unburned alcohol as characteristic components that are generated in an exhaust gas when an alcohol-containing fuel is used, and as a result the air/fuel ratio of the engine output gas departs from the purification window of the exhaust gas purification catalyst 42.

Therefore, in the system of the present embodiment, in order to improve the exhaust gas purification rate during the initial feedback period, it is important to precisely control the air/fuel ratio of the engine output gas during the initial feedback period so that the air/fuel ratio is maintained within the purification window. To achieve this, it is necessary to detect the air/fuel ratio of the engine output gas as accurately as possible, only from the output of the air/fuel ratio sensor 44. In order to detect the air/fuel ratio of the engine output gas as accurately as possible using the air/fuel ratio sensor output, it is important to precisely correct shifts in the air/fuel ratio sensor output that are caused by hydrogen, aldehyde, and unburned alcohol as described above.

The respective concentrations of hydrogen, aldehyde, and unburned alcohol that are generated in the engine output gas vary according to the combustion state of the fuel. The combustion state also differs according to the state of vaporization of the fuel. Further, the state of vaporization of the fuel is influenced by the temperature of the internal combustion engine 10 (temperature of a cylinder block or a cylinder head and the like). Therefore, the respective concentrations of hydrogen, aldehyde, and unburned alcohol in the engine output gas vary according to the temperature of the internal combustion engine 10 at the relevant time. More specifically, the respective concentrations of hydrogen, aldehyde, and unburned alcohol that are generated in the engine output gas during the initial feedback period exhibit different values according to the temperature of the internal combustion engine 10 during the initial feedback period.

In this case, the engine cooling water temperature can be regarded as approximately equivalent to the temperature of a cylinder block or a cylinder head of the internal combustion engine 10. Therefore, according to the present embodiment, the engine cooling water temperature (hereunder, referred to simply as "water temperature") is used as a representative temperature of the internal combustion engine 10.

The water temperature in the initial feedback period depends on the water temperature at engine start-up. More specifically, if the water temperature when the engine starts up is low, the water temperature when the main feedback control starts will also be low, and hence the water temperature in the initial feedback period will be low. In contrast, if the water temperature when the engine starts up is high, the water temperature when the main feedback control starts will also be high, and hence the water temperature in the initial feedback period will be high.

Figure 3:
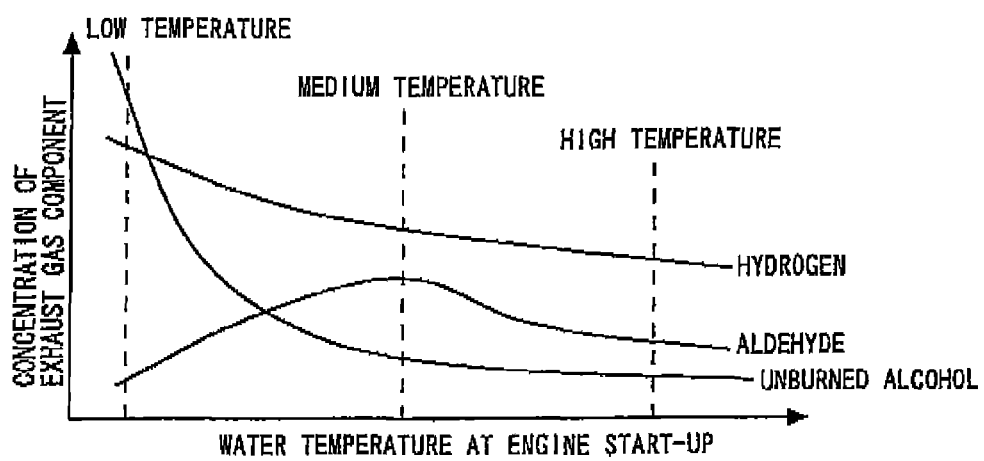
FIG. 3 is a view that illustrates the relationship between respective concentrations of hydrogen, aldehyde and unburned alcohol in engine output gas during an initial feedback period and a water temperature at engine start-up.

FIG. 3 is a view that illustrates the relationship between respective concentrations of hydrogen, aldehyde and unburned alcohol in engine output gas during the initial feedback period and the water temperature at engine start-up. Hereunder, the relationship between the concentrations of aldehyde and unburned alcohol in engine output gas during the initial feedback period and the water temperature at engine start-up (hereunder, referred to as "startup water temperature") is described referring to FIG. 3.

(When Startup Water Temperature is a Low Temperature)

When the startup water temperature is low, during the initial feedback period the unburned alcohol concentration increases and the aldehyde concentration decreases. The reasons are as follows. When the startup water temperature is low, since the water temperature is also low during the initial feedback period, it is difficult for the alcohol to vaporize and thus the proportion of alcohol that does not contribute to combustion increases. Consequently, the unburned alcohol concentration rises. On the other hand, when the proportion of alcohol that does not contribute to combustion increases, the generated amount of aldehyde that is an intermediate in the combustion reaction process of alcohol decreases. As a result, the aldehyde concentration is low.

(When Startup Water Temperature is a Medium Temperature)

Since the water temperature in the initial feedback period also increases as the startup water temperature increases, an alcohol is also more liable to vaporize. Consequently, the proportion of alcohol that vaporizes increases, and the proportion of alcohol that contributes to combustion also increases. Therefore, when the startup water temperature is a medium temperature, the unburned alcohol concentration is lower than in the case of a low temperature. Further, the generated amount of aldehyde that is an intermediate increases as the proportion of alcohol that contributes to combustion increases. Thus, when the startup water temperature is a medium temperature, the aldehyde concentration rises compared to the case of a low temperature.

(When Startup Water Temperature is a High Temperature)

When the startup water temperature is a high temperature, since the vaporization of alcohol is promoted further in comparison to the case of a medium temperature, the unburned alcohol concentration becomes even lower. On the other hand, the effect on the aldehyde concentration is as follows. When the startup water temperature is a high temperature, the proportion of alcohol that contributes to combustion increases further compared to the case of a medium temperature. However, when the water temperature increases, since combustion stabilizes and approaches complete combustion, the generated amount of aldehyde that is an intermediate (partially combusted component) in the combustion reaction process decreases. As a result, the aldehyde concentration when the startup water temperature is a high temperature becomes lower than in the case of a medium temperature.

The hydrogen concentration in the engine output gas during the initial feedback period tends to become lower as the startup water temperature increases. The reason is that, as the water temperature increases, combustion stabilizes and approaches complete combustion, and hence the generated amount of hydrogen as an intermediate (partially combusted component) in the combustion reaction process decreases. However, a change in the hydrogen concentration with respect to a change in the startup water temperature tends to be small in comparison to a change in an unburned alcohol or aldehyde concentration.

The concentration of a component in the engine output gas during the initial feedback period also differs according to the alcohol concentration of the fuel. FIG. 3 illustrates a case in which a fuel with a predetermined alcohol concentration is used. There is a tendency for an unburned alcohol concentration and an aldehyde concentration to increase in accordance with an increase in the alcohol concentration of the fuel. In contrast, there is a tendency for the hydrogen concentration not to change very much even if the alcohol concentration of the fuel changes.

In view of the above described facts, even when an alcohol-containing fuel is used it is possible to accurately detect the air/fuel ratio of the engine output gas using the air/fuel ratio sensor 44 during the initial feedback period by the following method (control).

(1) A correction value (hereunder, referred to as "hydrogen correction value") for correcting a shift to the rich side of the air/fuel ratio sensor output that is caused by hydrogen is a function of the hydrogen concentration. A correction value (hereunder, referred to as "aldehyde correction value") for correcting a shift to the lean side of the air/fuel ratio sensor output that is caused by aldehyde is a function of the aldehyde concentration. A correction value (hereunder, referred to as "unburned alcohol correction value") for correcting a shift to the lean side of the air/fuel ratio sensor output that is caused by unburned alcohol is a function of the unburned alcohol concentration. The correlations between these correction values and concentrations are previously determined by experimentation, and the results are previously stored as a map in the ECU 50.

(2) As described above, a ratio of exhaust gas components as shown in FIG. 3 varies according to the alcohol concentration of the fuel. Therefore, the correlations between exhaust gas component ratios and alcohol concentrations of fuels as shown in FIG. 3 are investigated in advance by experimentation using a plurality of fuels that have different alcohol concentrations, and the resulting correlations are previously stored in the ECU 50 as a map (hereunder, referred to as "exhaust gas component map").

(3) At engine start-up, the water temperature and the alcohol concentration of the fuel are detected, and based on the detection values and the above described exhaust gas component map, the hydrogen concentration, aldehyde concentration, and unburned alcohol concentration in the engine output gas during the initial feedback period are calculated.

(4) Based on the hydrogen concentration, aldehyde concentration, and unburned alcohol concentration calculated above, a hydrogen correction value, an aldehyde correction value and an unburned alcohol correction value are calculated.

(5) The main feedback control is executed during the initial feedback period after correcting the air/fuel ratio sensor output using the hydrogen correction value, aldehyde correction value, and unburned alcohol correction value described above.

As described above, a shift caused by the effect of hydrogen as a component that shifts the air/fuel ratio sensor output to the rich side and a shift caused by the effects of aldehyde and unburned alcohol as components that shift the air/fuel ratio sensor output to the lean side overlap with respect to the output of the air/fuel ratio sensor 44. According to the present invention, by performing the control as described in the above (1) to (5), the respective concentrations or ratios of hydrogen, aldehyde, and unburned alcohol can be precisely estimated during the initial feedback period, and a shift in the air/fuel ratio sensor output caused by these components can be accurately corrected. It is thus possible to accurately detect the air/fuel ratio of the engine output gas by means of the air/fuel ratio sensor 44. Consequently, during the initial feedback period, the air/fuel ratio of the engine output gas can be subjected to precise feedback control and the air/fuel ratio can be maintained within a purification window in the vicinity of the stoichiometric air/fuel ratio. Hence, the exhaust gas purification rate can be improved and emissions can be reduced.

According to the present invention, a configuration may be adopted so as to perform control as described in the above (1) to (5). In such a case, "estimating means" according to the second and third invention is realized by the ECU 50 executing the processing described in (3) above, and "air/fuel ratio feedback control means" and "sensor output correcting means" according to the first invention is realized by the ECU 50 executing the processing described in (4) and (5) above.

However, according to the control of the above described (1) to (5), in addition to the exhaust gas component map, it is necessary to previously prepare respective maps for a hydrogen correction value, an aldehyde correction value, and an unburned alcohol correction value, and store the maps in the ECU 50. Further, the correction values that are required in order to correct the air/fuel ratio sensor output change in accordance with the startup water temperature. Consequently, control for correcting the air/fuel ratio sensor output is complicated. Therefore, according to the present embodiment, in order to simplify the control, the following exhaust gas component ratio control is performed.

[Exhaust Gas Component Ratio Control]

In a case where, as in the present embodiment, the effect of a component (hydrogen) that shifts the air/fuel ratio sensor output to the rich side and the effect of components (aldehyde and unburned alcohol) that shift the air/fuel ratio sensor output to the lean side overlap with respect to the output of the air/fuel ratio sensor 44, the two effects offset each other. For example, in some cases, even if a hydrogen concentration is high, if an aldehyde concentration and an unburned alcohol concentration are also high, a shift in the air/fuel ratio sensor output will be small. Thus, the degree to which the air/fuel ratio sensor output shifts to either the rich side or the lean side is determined by the balance (ratio) between hydrogen, aldehyde, and unburned alcohol in the exhaust gas. Conversely, even when the concentrations of hydrogen, aldehyde, and unburned alcohol are different, if the ratios thereof are equal (if concentrations of the respective components are equal multiples), shifts that arise in the air/fuel ratio sensor output will be the same.

Accordingly, if control can be performed so that ratios of hydrogen, aldehyde and unburned alcohol in exhaust gas become equal, since correction values for correcting the air/fuel ratio sensor output may be the same, correction of the air/fuel ratio sensor output is simplified. Therefore, according to the present embodiment, exhaust gas component ratio control is performed that makes a ratio between hydrogen, aldehyde and unburned alcohol (hereunder, abbreviated to "exhaust gas component ratio") in engine output gas during the initial feedback period a constant value irrespective of the startup water temperature.

Figure 4:
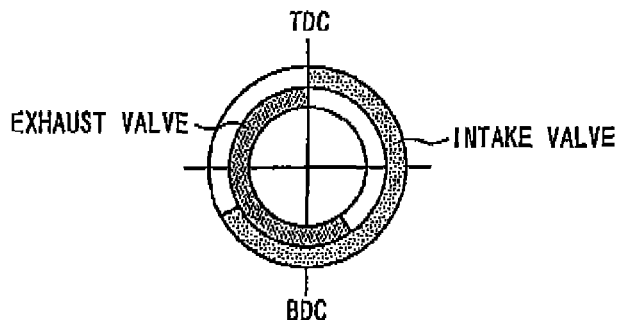
FIG. 4 is a view that illustrates an example of a valve opening period of an intake valve and an exhaust valve during execution of an exhaust gas component ratio control.
Figure 5:
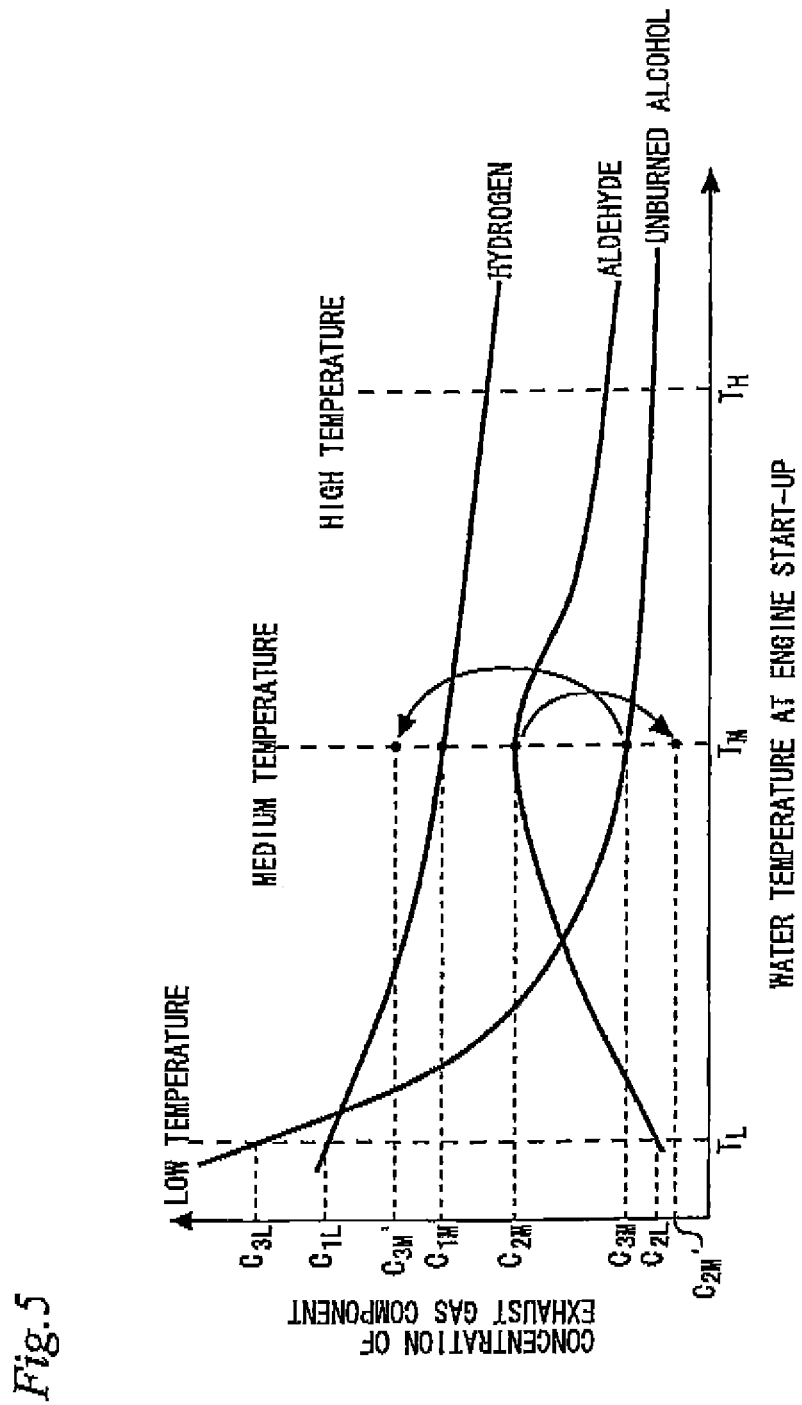
FIG. 5 is a view that illustrates the relationship between respective concentrations of hydrogen, aldehyde and unburned alcohol in engine output gas during an initial feedback period and a water temperature at engine start-up.

FIG. 4 is a view that illustrates an example of a valve opening period of the intake valve 12 and the exhaust valve 14 during execution of exhaust gas component ratio control. In this connection, the graph in the aforementioned FIG. 3 represents an exhaust gas component ratio in a case where engine output gas reduction control is continuing without executing exhaust gas component ratio control. FIG. 5 is a similar view to FIG. 3. Hereunder, the exhaust gas component ratio control is described referring to FIG. 4 and FIG. 5.

According to the present embodiment, control that advances the intake valve opening timing and retards the intake valve closing timing is performed by the intake variable valve apparatus 52 as the exhaust gas component ratio control. As shown in FIG. 4, during the exhaust gas component ratio control, the intake valve opening timing is advanced so as to be close to the top dead centre. As a result, since negative pressurization of the inside of the cylinder is suppressed when the intake valve 12 opens, the intake airflow speed to inside the cylinder decreases. Consequently, since atomization of a fuel spray is suppressed and it becomes difficult for alcohol to vaporize, the proportion of alcohol that does not contribute to combustion increases and the emitted amount of unburned alcohol increases. Further, during the exhaust gas component ratio control, the intake valve closing timing is retarded and the intake valve 12 closes at a position that is remote from the bottom dead center. Since the actual compression ratio decreases as the intake valve closing timing moves away from the bottom dead center, the temperature in the cylinder decreases. Therefore, since vaporization of alcohol is suppressed and it becomes difficult for alcohol to vaporize, the proportion of alcohol that does not contribute to combustion increases and the emitted amount of unburned alcohol increases.

More specifically, according to the exhaust gas component ratio control, vaporization of alcohol is suppressed and the proportion of alcohol that does not contribute to combustion is increased. As a result, the unburned alcohol concentration in the engine output gas increases. Further, when the proportion of alcohol that does not contribute to combustion increases, the generated amount of aldehyde that is an intermediate in a combustion reaction decreases. Consequently, the aldehyde concentration in the engine output gas decreases.

According to the exhaust gas component ratio control of the present embodiment, control is performed so that, irrespective of the startup water temperature, the exhaust gas component ratio during the initial feedback period becomes close to the exhaust gas component ratio in a case where the startup water temperature is a predetermined temperature $T_L$ that is in a low temperature region. As shown in FIG. 5, when the startup water temperature is $T_L$, the exhaust gas component ratio during the initial feedback period is hydrogen:aldehyde:unburned alcohol=$C_{1L}:C_{2L}:C_{3L}$. A correction value (hereunder, referred to as "output shift correction value") for correcting a shift in the air/fuel ratio sensor output caused by hydrogen, aldehyde, and unburned alcohol is uniquely determined based on the ratio between these components, that is, the exhaust gas component ratio. According to the present embodiment, the output shift correction value is calculated beforehand based on the exhaust gas component ratio $C_{1L}:C_{2L}:C_{3L}$ in the case of the startup water temperature $T_L$, and stored in the ECU 50. In this case, if the alcohol concentration of the fuel is different, the exhaust gas component ratio $C_{1L}:C_{2L}:C_{3L}$ that corresponds to the startup water temperature $T_L$ will also be different. Accordingly, the output shift correction value also differs according to the alcohol concentration of the fuel. Therefore, correlations between the alcohol concentrations of fuels and output shift correction values are stored in advance as a map in the ECU 50.

As will be understood from FIG. 5, when the startup water temperature is higher than $T_L$, compared to a case in which the startup water temperature is $T_L$, the hydrogen concentration decreases, while the aldehyde concentration increases. More specifically, the aldehyde concentration exhibits an opposite tendency to the hydrogen concentration. Further, although an unburned alcohol concentration when the startup water temperature is higher than $T_L$ is lower in comparison to a case in which the startup water temperature is $T_L$, similarly to the hydrogen concentration, the proportion of a change in the unburned alcohol concentration is greater than that in the case of the hydrogen concentration. Accordingly, if the exhaust gas component ratio control is not performed, in comparison to the exhaust gas component ratio when the startup water temperature is $T_L$, there will be an excessively large proportion of aldehyde and an excessively small proportion of unburned alcohol in the exhaust gas component ratio when the startup water temperature is higher than $T_L$. In contrast, when the aforementioned exhaust gas component ratio control is performed, the unburned alcohol concentration can be increased and the aldehyde concentration can be decreased. It is thus possible to correct both the proportion of aldehyde that is excessively large and the proportion of unburned alcohol that is excessively small, and to bring the ratio close to the exhaust gas component ratio in a case where the startup water temperature is $T_L$.

For example, as shown in FIG. 5, when the startup water temperature is a predetermined temperature $T_M$ that is in a medium temperature region, if the exhaust gas component ratio control is not executed the exhaust gas component ratio during the initial feedback period will be hydrogen:aldehyde: unburned alcohol=$C_{1M}:C_{2M}:C_{3M}$. In this case, the exhaust gas component ratio control is executed so as to increase the unburned alcohol concentration to $C_{3M}'$ and to lower the aldehyde concentration to $C_{2M}'$. Here, $C_{2M}'$ and $C_{3M}'$ are values that satisfy an equation $C_{1M}:C_{2M}':C_{3M}'=C_{1L}:C_{2L}:C_{3L}$. By performing the exhaust gas component ratio control in this manner, the exhaust gas component ratio during the initial feedback period becomes hydrogen:aldehyde:unburned alcohol=$C_{1M}:C_{2M}':C_{3M}'=C_{1L}:C_{2L}:C_{3L}$. Accordingly, the air/fuel ratio sensor output can be appropriately corrected using an output shift correction value that corresponds to the startup water temperature $T_L$ that is stored in the ECU 50.

As described above, according to the exhaust gas component ratio control of the present embodiment, the exhaust gas component ratio is controlled during the initial feedback period by taking the ratio $C_{1L}:C_{2L}:C_{3L}$ in the case of the startup water temperature $T_L$ as a target ratio. More specifically, irrespective of the startup water temperature, the exhaust gas component ratio during the initial feedback period is controlled so as to be close to the ratio $C_{1L}:C_{2L}:C_{3L}$ in the case of the startup water temperature $T_L$.

During the exhaust gas component ratio control, an amount of an increase in the unburned alcohol concentration and an amount of a decrease in the aldehyde concentration increase in accordance with an increase in an amount by which the intake valve opening timing is advanced or an amount by which the intake valve closing timing is retarded. Thus, the amount of increase in the unburned alcohol concentration and the amount of decrease in the aldehyde concentration can be controlled by controlling the amount by which the intake valve opening timing is advanced or the amount by which the intake valve closing timing is retarded. Hence, by controlling the amount by which the intake valve opening timing is advanced or the amount by which the intake valve closing timing is retarded, even when the startup water temperature is a temperature other than $T_M$, the exhaust gas component ratio can be controlled so as to be close to the target ratio (hydrogen:aldehyde:unburned alcohol=$C_{1L}:C_{2L}:C_{3L}$).

In this connection, although according to the exhaust gas component ratio control of the present embodiment the unburned alcohol concentration and aldehyde concentration are changed and the hydrogen concentration is not changed, a configuration may also be adopted according to the present invention in which the hydrogen concentration is also changed as necessary. Since hydrogen is an intermediate of the combustion reaction, the amount of hydrogen that is emitted increases in accordance with an increase in the degree to which combustion is incomplete, and the emitted amount decreases as the combustion reaction approaches complete combustion. The lower that the level of homogeneity of the air/fuel mixture is, the more incomplete the combustion will be, while, conversely, the higher that the level of homogeneity of the air/fuel mixture is, the greater the degree to which the combustion reaction will approach complete combustion. The homogeneity of an air/fuel mixture can be controlled, for example, by a vortex control valve (not shown) that adjusts the strength of a vortex (tumble, swirl or the like) that is generated inside a cylinder. Hence, the hydrogen concentration can be controlled by adjusting the homogeneity of an air/fuel mixture using this kind of vortex control valve.

Figure 6:
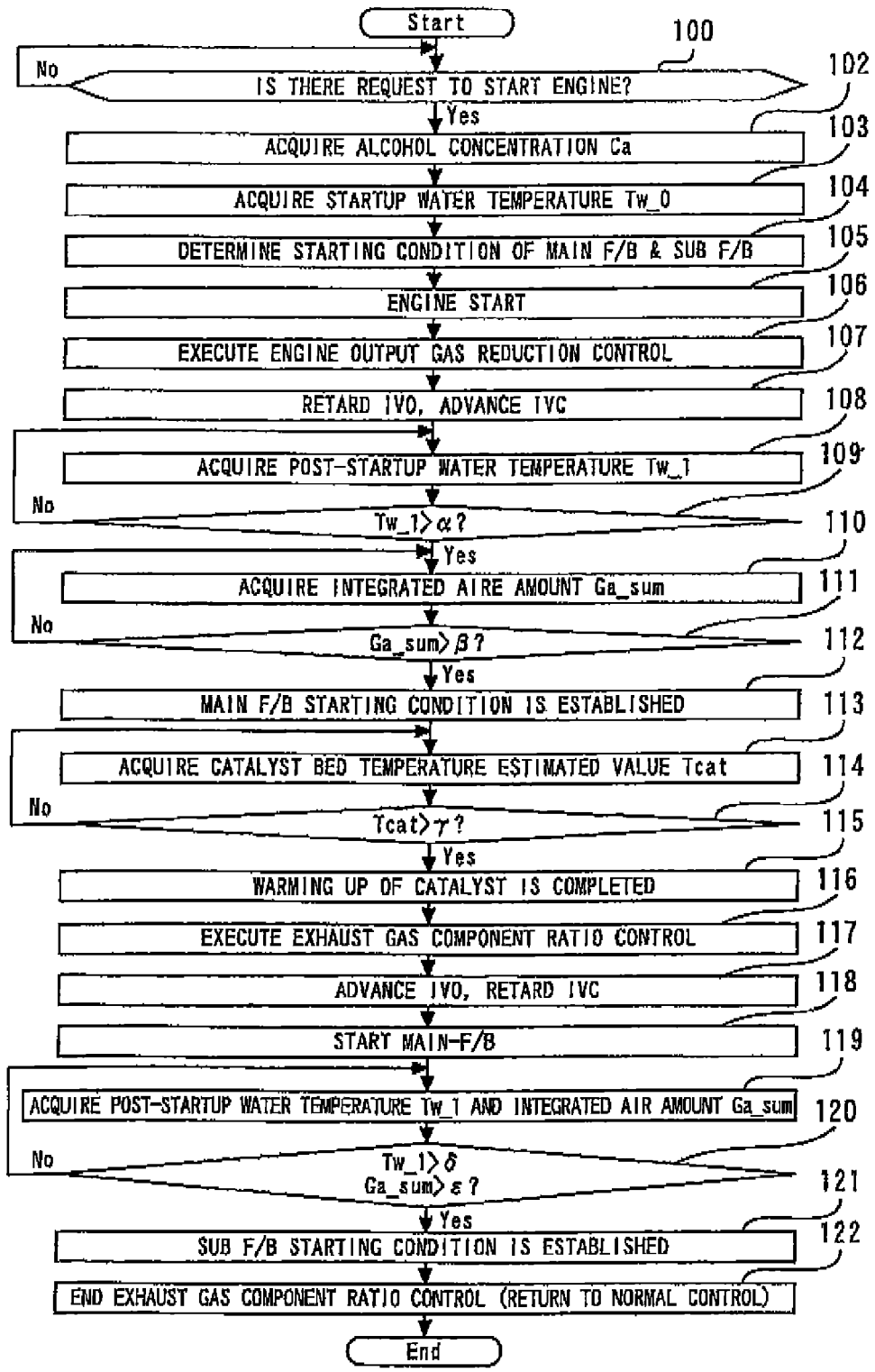
FIG. 6 is a flowchart illustrating a routine that is executed by Embodiment 3 of the present invention.

FIG. 6 is a flowchart of a routine that the ECU 50 executes at start-up of the internal combustion engine 10 to realize the above described functions. According to the routine shown in FIG. 6, first, the ECU 50 determines whether or not there is a request to start the internal combustion engine 10 (step 100). When the ECU 50 determines that there is a request to start the internal combustion engine 10, the ECU 50 acquires an alcohol concentration Ca of the fuel that is detected by the fuel property sensor 60 and a startup water temperature Tw_0 that is detected by the water temperature sensor 48 (steps 102 and 103).

Next, processing that determines a starting condition of the main feedback control and a starting condition of the sub-feedback control is performed as described hereafter (step 104). Since the temperatures of the air/fuel ratio sensor 44 and the sub-exhaust gas sensor 46 after start-up can be estimated based on the amount of heat that the air/fuel ratio sensor 44 and the sub-exhaust gas sensor 46 receive from the exhaust gas, there is a correlation between the temperatures of the air/fuel ratio sensor 44 and sub-exhaust gas sensor 46 and the integrated exhaust gas amount from the time of engine start-up. The integrated exhaust gas amount from the time of engine start-up correlates with an integrated air amount Ga_sum that is a total of intake air flows detected by the air flow meter 33 from the time of engine start-up. Therefore, activation of the air/fuel ratio sensor 44 or the sub-exhaust gas sensor 46 can be determined based on the integrated air amount G_sum. In step 104, a determination value β for determining activation of the air/fuel ratio sensor 44 based on the integrated air amount Ga_sum and a determination value ε ($>$β) for determining activation of the sub-exhaust gas sensor 46 are determined based on the integrated air amount Ga_sum. The lower that the startup water temperature T_0 is, the longer it takes until activation of the air/fuel ratio sensor 44 or the sub-exhaust gas sensor 46. Consequently, the determination values β and ε are calculated so as to increase as the startup water temperature Tw_0 decreases. Further, in order to accurately determine activation of the air/fuel ratio sensor 44 or the sub-exhaust gas sensor 46, the water temperature after engine start-up should also be taken into consideration when determining the activation thereof. Therefore, in step 104, a determination value α for determining activation of the air/fuel ratio sensor 44 based on the water temperature after engine start-up and a determination value δ ($>$α) for determining activation of the sub-exhaust gas sensor 46 based on the water temperature after engine start-up are also calculated. The determination values α and δ are also calculated so as to increase as the startup water temperature Tw_0 decreases.

Figure 7:
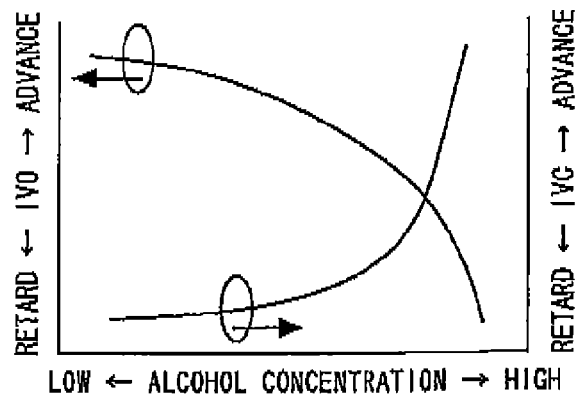
FIG. 7 is a map that illustrates the relationship between an intake valve opening timing (IVO) and intake valve closing timing (IVC) during the engine output gas reduction control and an alcohol concentration of a fuel.

After the above described processing in step 104, the crankshaft 45 of the internal combustion engine 10 is subjected to a cranking operation by an electric motor (unshown) to start the internal combustion engine 10 (step 105). After start-up, the intake variable valve apparatus 52 is controlled to execute the engine output gas reduction control (step 106). According to the engine output gas reduction control, the intake valve opening timing (IVO) is retarded to a timing that is later than the top dead centre, and the intake valve closing timing (IVC) is advanced to approach the bottom dead center (step 107). FIG. 7 is a map that illustrates the relationship between the intake valve opening timing (IVO) and intake valve closing timing (IVC) during the engine output gas reduction control and the alcohol concentration of the fuel. In the aforementioned step 107, the intake valve opening timing (IVO) and the intake valve closing timing (IVC) are controlled based on the map shown in FIG. 7. More specifically, control is performed so that the higher the alcohol concentration Ca of the fuel that is acquired in the aforementioned step 102, the greater the degree to which the intake valve opening timing (IVO) is retarded and to which the intake valve closing timing (IVC) is advanced.

Subsequently, the current water temperature that is detected by the water temperature sensor 48 is acquired as a post-startup water temperature Tw_1 (step 108), and the ECU 50 determines whether or not the post-startup water temperature Tw_1 exceeds the determination value α (step 109). If the post-startup water temperature Tw_1 exceeds the determination value α, next, the current integrated air amount Ga_sum is acquired (step 110), and the ECU 50 determines whether or not the integrated air amount Ga_sum exceeds the determination value β, (step 111). If the post-startup water temperature Tw_1 exceeds the determination value α and the integrated air amount Ga_sum exceeds the determination value β, it can be determined that the air/fuel ratio sensor 44 has been activated. Hence, the ECU 50 determines that the main feedback starting condition (activation of the air/fuel ratio sensor 44) is established (step 112).

Next, the ECU 50 acquires a catalyst bed temperature estimated value Tcat of the exhaust gas purification catalyst 42 (step 113). The catalyst bed temperature of the exhaust gas purification catalyst 42 after engine start-up correlates with a total energy amount of an exhaust gas that flows into the exhaust gas purification catalyst 42 from the time of engine start-up, and can be estimated by the ECU 50 performing a known operation based on the integrated air amount Ga_sum or an integrated fuel injection quantity or the like. The catalyst bed temperature estimated value Tcat is a value calculated in the foregoing manner by the ECU 50. The catalyst bed temperature estimated value Tcat acquired in the aforementioned step 113 is compared with a predetermined determination value γ (step 114). The determination value γ is a value that corresponds to an activation temperature of the catalyst. In the above described step 114, if the catalyst bed temperature estimated value Tcat exceeds the determination value γ, the ECU 50 determines that warming up of the exhaust gas purification catalyst 42 is completed (the exhaust gas purification catalyst 42 is activated) (step 115).

If the ECU 50 determines that warming up (activation) of the exhaust gas purification catalyst 42 is completed in the aforementioned step 115, the ECU 50 controls the intake variable valve apparatus 52 to execute the above described exhaust gas component ratio control (step 116). According to the exhaust gas component ratio control, as described above, the intake valve opening timing is advanced so as to approach the top dead centre, and the intake valve closing timing is retarded so as to move away from the bottom dead center (step 117). As described above, the exhaust gas component ratio control is executed to make the exhaust gas component ratio during the initial feedback period approach the target ratio (the ratio $C_{1L}:C_{2L}:C_{3L}$ in the case of startup water temperature $T_L$). A map for calculating the intake valve opening timing and the intake valve closing timing during the exhaust gas component ratio control based on the alcohol concentration of the fuel and the startup water temperature is previously stored in the ECU 50. The map is created by performing experiments to previously determine valve timings of the intake valve 12 that allow the exhaust gas component ratio during the initial feedback period to match the aforementioned target ratio. In the aforementioned step 117, the intake valve opening timing and the intake valve closing timing are calculated based on the map, the alcohol concentration Ca acquired in the aforementioned step 102, and the startup water temperature Tw_0 acquired in the aforementioned step 103. The intake variable valve apparatus 52 is controlled so as to implement the calculated intake valve opening timing and intake valve closing timing.

Following the processing of the aforementioned step 117, the main feedback control is started (step 118). As described above, an output shift correction value map that defines a relationship between an alcohol concentration of a fuel and the output shift correction value is previously stored in the ECU 50. During the main feedback control in step 118, first, an output shift correction value is calculated based on the output shift correction value map and the alcohol concentration Ca acquired in the above described step 102. The air/fuel ratio sensor output is then corrected by means of the calculated output shift correction value. The ECU 50 executes processing that controls the fuel injection quantity of the fuel injector 22 so that the air/fuel ratio sensor output after correction is a value that corresponds to the target air/fuel ratio.

The output shift correction value that is calculated by means of the output shift correction value map is a value that is determined by taking into account the fact that, with respect to the exhaust gas component ratio $(C_{1L}:C_{2L}:C_{3L})$ for a case where the startup water temperature is $T_L$, hydrogen shifts the air/fuel ratio sensor output to the rich side, aldehyde shift the air/fuel ratio sensor output to the lean side, and unburned alcohol shifts the air/fuel ratio sensor output to the lean side, and is determined so as to correct the respective shifts. By executing the exhaust gas component ratio control (steps 116 and 117), irrespective of the startup water temperature Tw_0, the exhaust gas component ratio is controlled so as to be a ratio that is close to the target ratio $C_{1L}:C_{2L}:C_{3L}$. Accordingly, in the main feedback control of the aforementioned step 118, a shift in the air/fuel ratio sensor output can be appropriately corrected by means of the output shift correction value as described above. Therefore, the air/fuel ratio of the engine output gas can be subjected to precise feedback control, and can be maintained within a purification window in the vicinity of the stoichiometric air/fuel ratio. Hence, the exhaust gas purification rate of the exhaust gas purification catalyst 42 can be improved and emissions can be reduced. Further, according to the present embodiment, since the air/fuel ratio sensor output can be corrected using the same output shift correction value irrespective of the startup water temperature Tw_0, the control can be simplified and the control accuracy is also improved.

Following the processing of the aforementioned step 118, a post-startup water temperature Tw_1 that is the current water temperature that is detected by the water temperature sensor 48 and the current integrated air amount Ga_sum are respectively acquired (step 119). Next, the ECU 50 determines whether or not the post-startup water temperature Tw_1 exceeds the determination value δ, and whether or not the integrated air amount Ga_sum exceeds the determination value ε (step 120). It can be determined that the sub-exhaust gas sensor 46 has been activated when the post-startup water temperature Tw_1 exceeds the determination value δ and the integrated air amount Ga_sum exceeds the determination value ε, and hence, in that case, it is determined that the sub-feedback starting condition has been established (step 121).

If the ECU 50 determines in the aforementioned step 121 that the sub-feedback starting condition has been established, the ECU 50 starts execution of the sub-feedback control. When the sub-feedback control is started, the exhaust gas component ratio control is ended (step 122), and correction of the air/fuel ratio sensor output by means of the above described output shift correction value is also ended. After the end of the exhaust gas component ratio control, the intake variable valve apparatus 52 is controlled according to a map that specifies the valve timing during normal operation.

Figure 8:
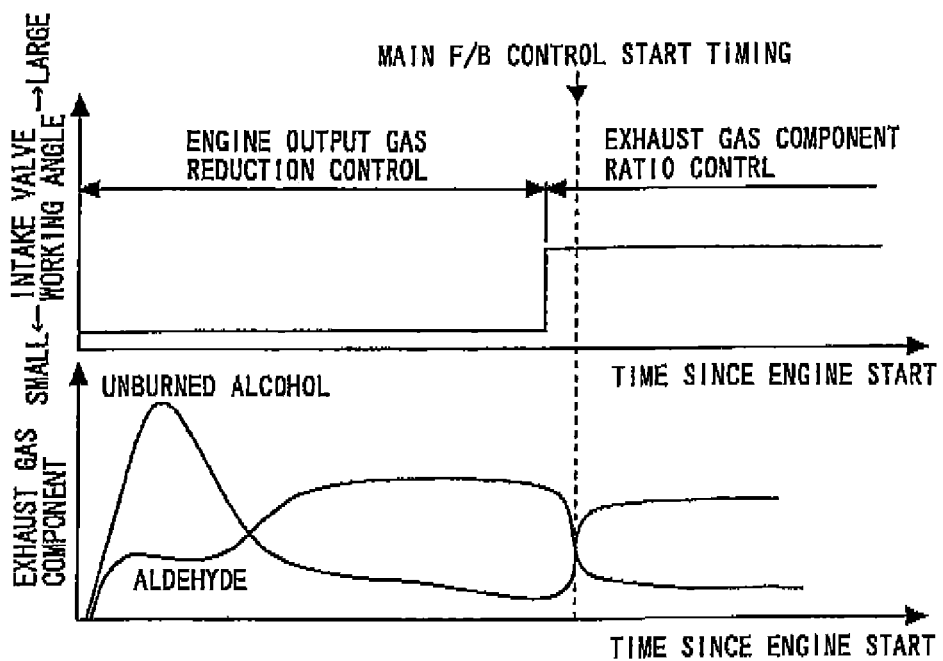
FIG. 8 is a graph that illustrates changes over time in an unburned alcohol concentration and aldehyde concentration in engine output gas as well as in a working angle of the intake valve in a case where control is executed according to the routine shown in FIG. 6.

FIG. 8 is a graph that illustrates changes over time in the unburned alcohol concentration and aldehyde concentration in engine output gas as well as in a working angle of the intake valve 12 in a case where control is executed according to the routine shown in FIG. 6. As will be understood from FIG. 2 and FIG. 4, the working angle of the intake valve 12 is small during the engine output gas reduction control, and the working angle of the intake valve 12 is large during the exhaust gas component ratio control. Consequently, as shown in FIG. 8, when switching from the engine output gas reduction control to the exhaust gas component ratio control, the working angle of the intake valve 12 expands. After the valve timing of the intake valve 12 is changed, there is a lag of a certain extent until the exhaust gas component ratio at the position of the air/fuel ratio sensor 44 changes. In consideration of this lag, it is desirable to start the exhaust gas component ratio control at a timing that is a little earlier than the timing at which the main feedback control is started.

As shown in FIG. 8, the aldehyde concentration in the engine output gas after the exhaust gas component ratio control is lower than the aldehyde concentration in the engine output gas before the exhaust gas component ratio control. In contrast, the unburned alcohol concentration in the engine output gas after the exhaust gas component ratio control is higher than the unburned alcohol concentration in the engine output gas before the exhaust gas component ratio control. After the start of the main feedback control, harmful components in the engine output gas, including aldehyde and unburned alcohol, are favorably purified at the exhaust gas purification catalyst 42. Therefore, it is not a problem in terms of emissions even if the unburned alcohol concentration in the engine output gas increases due to the exhaust gas component ratio control.

According to the exhaust gas component ratio control of the present embodiment, the combustion state of the internal combustion engine 10 is changed by changing the valve opening characteristics of the intake valve 12 to thereby control the exhaust gas component ratio. In this respect, according to the present invention, a method that changes a combustion state in order to perform exhaust gas component ratio control is not limited to a method that changes the valve opening characteristics of the intake valve 12, and for example, a method described hereunder can be adopted for independent use or for use in combination with another method.

(Method that Changes Valve Opening Characteristics of Exhaust Valve 14)

When a method is adopted that advances the closing time of the exhaust valve 14 to cause the exhaust valve 14 to close before the top dead centre and the intake valve opening timing, exhaust gas remaining inside the cylinder after the exhaust valve 14 closes is compressed. When the intake valve 12 opens, the compressed exhaust gas is blown back vigorously towards the intake port 18. As a result, atomization or evaporation of the fuel is promoted. Therefore, by performing the above control during the engine output gas reduction control, the vaporization of alcohol can be promoted. Further, during the exhaust gas component ratio control, by returning the closing time of the exhaust valve 14 to its original time to make the closing time come after the top dead centre and the intake valve opening timing, vaporization of alcohol can be suppressed, the unburned alcohol concentration can be increased, and the aldehyde concentration can be reduced.

(Method Using Vortex Control Valve)

When a vortex control valve is provided that adjusts the strength of a vortex (tumble, swirl or the like) that is generated inside a cylinder, vaporization of alcohol can be promoted by increasing the strength of a vortex during engine output gas reduction control, since atomization of the fuel is promoted thereby. Further, by weakening the strength of a vortex during the exhaust gas component ratio control, it is possible to suppress vaporization of alcohol, increase the unburned alcohol concentration, and decrease the aldehyde concentration.

(Method that Changes Fuel Injection Pressure)

When a mechanism is provided that varies the fuel injection pressure of the fuel injector 22, vaporization of alcohol can be promoted by increasing the fuel injection pressure during the engine output gas reduction control, since atomization of the fuel is promoted thereby. Further, by reducing the fuel injection pressure during the exhaust gas component ratio control, it is possible to suppress vaporization of alcohol, increase the unburned alcohol concentration, and decrease the aldehyde concentration.

(Method that Changes Fuel Heating Amount)

When the fuel injector 22 or the intake port 18 or the like includes a heater for heating fuel, vaporization of alcohol can be promoted by increasing the amount of fuel heating by the heater during the engine output gas reduction control. Further, by decreasing the amount of fuel heating by the heater during the exhaust gas component ratio control, it is possible to suppress vaporization of alcohol, increase the unburned alcohol concentration, and decrease the aldehyde concentration.

In this connection, under a condition in which vaporization of alcohol is particularly favorable during the initial feedback period, a case may arise in which an unburned alcohol concentration in the engine output gas becomes extremely low and it is not a problem to ignore an effect whereby the unburned alcohol shifts the air/fuel ratio sensor output to the lean side. In such a case, according to the present invention, a shift in the air/fuel ratio sensor output may be corrected without taking into account the fact that unburned alcohol shifts the air/fuel ratio sensor output to the lean side. Further, the unburned alcohol concentration need not be changed during the exhaust gas component ratio control. More specifically, according to the present invention, it is sufficient to correct a shift in the air/fuel ratio sensor output by taking into account at least the fact that aldehyde in the engine output gas shift the air/fuel ratio sensor output to the lean side. Further, according to the present invention, it is sufficient to perform control so that a target ratio is achieved with respect to an aldehyde concentration and a hydrogen concentration by changing at least the aldehyde concentration in the engine output gas during the exhaust gas component ratio control.

In the above described Embodiment 1, the intake variable valve apparatus 52 corresponds to "combustion state variable means" according to the fourth invention, the ECU 50 corresponds to "storing means" according to the fourth invention, and the "fuel property sensor 60" corresponds to "alcohol concentration acquiring means" according to the fifth invention. Further, the "air/fuel ratio feedback control means" and the "sensor output correcting means" according to the first invention as well as the "output shift correction value calculating means" according to the sixth invention are realized by the ECU 50 executing the processing of the aforementioned step 118, and the "exhaust gas component ratio control means" according to the fourth invention is realized by the ECU 50 executing the processing of the aforementioned steps 116 and 117.

REFERENCE SIGNS LIST

| | |
|---|---|
| 10 | internal combustion engine |
| 12 | intake valve |
| 14 | exhaust valve |
| 16 | spark plug |
| 22 | fuel injector |
| 30 | intake passage |
| 33 | air flow meter |
| 36 | throttle valve |
| 40 | exhaust passage |
| 42 | purification catalyst |
| 44 | air/fuel ratio sensor |
| 46 | sub-exhaust gas sensor |
| 48 | water temperature sensor |
| 50 | ECU |
| 52 | intake variable valve apparatus |
| 54 | exhaust variable valve apparatus |

The invention claimed is:

1. An exhaust emission control apparatus for an internal combustion engine, comprising:
    an exhaust gas purification catalyst that is arranged in an exhaust gas passage of the internal combustion engine and that purifies an exhaust gas;
    an air/fuel ratio sensor that is arranged on an upstream side of the exhaust gas purification catalyst and that detects an air/fuel ratio of an exhaust gas that is discharged from the internal combustion engine;
    air/fuel ratio feedback control means that performs feedback control of the air/fuel ratio of the internal combustion engine based on an output of the air/fuel ratio sensor; and
    sensor output correcting means that corrects a shift in the output of the air/fuel ratio sensor that is caused by a component included in the exhaust gas;
    wherein the sensor output correcting means is configured so as to correct a shift in the output of the air/fuel ratio sensor using a lean shift amount of the output of the air/fuel ratio sensor in accordance with a quantity and/or a proportion of an aldehyde included in the exhaust gas.

2. The exhaust emission control apparatus for an internal combustion engine according to claim 1, wherein the sensor output correcting means is configured so as to correct a shift in an output of the air/fuel ratio sensor by taking into account a fact that unburned alcohol included in an exhaust gas shifts an output of the air/fuel ratio sensor to a lean side.

3. The exhaust emission control apparatus for an internal combustion engine according to claim 1, wherein the sensor output correcting means includes estimating means that estimates an aldehyde concentration in an exhaust gas that is discharged from the internal combustion engine or a ratio between an aldehyde concentration and a hydrogen concentration in the exhaust gas, and corrects a shift in the output of the air/fuel ratio sensor based on an estimation result of the estimating means.

4. The exhaust emission control apparatus for an internal combustion engine according to claim 3, further comprising:
    alcohol concentration acquiring means that detects or estimates an alcohol concentration of a fuel; and
    engine temperature detecting means that detects a representative temperature of the internal combustion engine;
    wherein the estimating means performs the estimation by referring to at least an alcohol concentration that is acquired by the alcohol concentration acquiring means and a representative temperature that is detected by the engine temperature detecting means.

5. The exhaust emission control apparatus for an internal combustion engine according to claim 1, further comprising:
    an electronic control unit that is programmed to change a combustion state of the internal combustion engine so that at least an aldehyde concentration is changed among components included in an exhaust gas that is discharged from the internal combustion engine;
    exhaust gas component ratio control means that, at a predetermined timing after engine startup, starts an exhaust gas component ratio control that controls the electronic control unit so that a ratio between an aldehyde concentration and a hydrogen concentration in the exhaust gas that is discharged from the internal combustion engine is close to a target ratio; and
    storing means that stores an output shift correction value for correcting a shift in an output of the air/fuel ratio sensor;
    wherein the sensor output correcting means corrects the shift in the output of the air/fuel ratio sensor using an output shift correction value that is stored in the storing means.

6. The exhaust emission control apparatus for an internal combustion engine according to claim 5, wherein the predetermined timing is related with a timing at which the feedback control starts or a timing at which the exhaust gas purification catalyst is activated.

7. The exhaust emission control apparatus for an internal combustion engine according to claim 5, wherein the output shift correction value is a value that is determined so as to correct a shift in an output of the air/fuel ratio sensor that occurs in a case where an aldehyde and hydrogen are included at the target ratio in an exhaust gas.

8. The exhaust emission control apparatus for an internal combustion engine according to claim 5,
    wherein the storing means stores a relationship between an alcohol concentration of a fuel and the output shift correction value;
    the exhaust emission control apparatus further comprising:
    alcohol concentration acquiring means that detects or estimates an alcohol concentration of a fuel; and
    output shift correction value calculating means that calculates the output shift correction value based on an alcohol concentration that is acquired by the alcohol concentration acquiring means and the relationship.

9. The exhaust emission control apparatus for an internal combustion engine according to claim 5, wherein
    the electronic control unit varies a valve-opening characteristic of one or both of an intake valve and an exhaust valve of the internal combustion engine; and
    the electronic control unit changes a combustion state by changing a valve-opening characteristic of one or both of the intake valve and the exhaust valve.

10. The exhaust emission control apparatus for an internal combustion engine according to claim 5, further comprising:
- a sub-exhaust gas sensor that is installed on a downstream side of the exhaust gas purification catalyst; and
- sub-feedback control means that performs sub-feedback control for supplementing the feedback control, based on an output of the sub-exhaust gas sensor;
- wherein the exhaust gas component ratio control means ends the exhaust gas component ratio control accompanying a start of the sub-feedback control.

11. The exhaust emission control apparatus for an internal combustion engine according to claim 5, wherein the exhaust gas component ratio control means controls the electronic control unit so that an aldehyde concentration in an exhaust gas that is discharged from the internal combustion engine after the exhaust gas component ratio control starts becomes lower than an aldehyde concentration in an exhaust gas that is discharged from the internal combustion engine before the exhaust gas component ratio control starts.

12. The exhaust emission control apparatus for an internal combustion engine according to claim 5, wherein the exhaust gas component ratio control means controls the electronic control unit so that an unburned alcohol concentration in an exhaust gas that is discharged from the internal combustion engine after the exhaust gas component ratio control starts becomes higher than an unburned alcohol concentration in an exhaust gas that is discharged from the internal combustion engine before the exhaust gas component ratio control starts.

* * * * *